(12) United States Patent
Kazakoff et al.

(10) Patent No.: US 10,408,376 B2
(45) Date of Patent: Sep. 10, 2019

(54) SAFETY TOOL AND METHOD FOR PIPELINE PIG EXTRACTION

(71) Applicant: CONOCOPHILLIPS COMPANY, Houston, TX (US)

(72) Inventors: Michael Jeff Kazakoff, Grand Prairie (CA); Dale George Gobin, Alberta (CA); Mark Kappelhoff, Calgary (CA)

(73) Assignee: ConocoPhillips Company, Houston, TX (US)

( * ) Notice: Subject to any disclaimer, the term of this patent is extended or adjusted under 35 U.S.C. 154(b) by 1072 days.

(21) Appl. No.: 14/303,358

(22) Filed: Jun. 12, 2014

(65) Prior Publication Data

US 2015/0362117 A1 Dec. 17, 2015

(51) Int. Cl.
*F16L 55/46* (2006.01)

(52) U.S. Cl.
CPC ......... *F16L 55/46* (2013.01); *Y10T 29/49817* (2015.01)

(58) Field of Classification Search
CPC .......... F16L 55/46; B25B 27/14; B25B 33/00; Y10T 29/53909; Y10T 29/53943; Y10T 29/53991; B25G 1/04
See application file for complete search history.

(56) References Cited

U.S. PATENT DOCUMENTS

| | | | | |
|---|---|---|---|---|
| 2,575,146 A * | 11/1951 | Thomas | ............... | B08B 9/0554 |
| | | | | 15/104.062 |
| 3,303,525 A | 2/1967 | Peoples et al. | | |
| 4,759,579 A * | 7/1988 | Swenson | ............... | F16L 55/46 |
| | | | | 294/209 |
| 5,524,675 A | 6/1996 | Berger | | |
| 7,954,194 B2 * | 6/2011 | Hepburn | ............... | B08B 9/055 |
| | | | | 15/104.061 |
| 9,010,826 B1 * | 4/2015 | Osborne | ............... | F16L 55/46 |
| | | | | 294/175 |
| 2011/0174387 A1 * | 7/2011 | Olivier | ............... | B66F 7/0625 |
| | | | | 137/15.07 |
| 2012/0168535 A1 * | 7/2012 | Chen | ............... | A47L 1/08 |
| | | | | 239/532 |
| 2012/0210585 A1 * | 8/2012 | Gieske | ............... | A01G 3/086 |
| | | | | 30/296.1 |
| 2014/0259534 A1 * | 9/2014 | Shields | ............... | B25G 1/04 |
| | | | | 16/429 |
| 2014/0352123 A1 * | 12/2014 | Sonnenberg | ............... | F16L 55/46 |
| | | | | 29/426.1 |

FOREIGN PATENT DOCUMENTS

CA 2016138 11/1991

* cited by examiner

*Primary Examiner* — Matthew P Travers
(74) *Attorney, Agent, or Firm* — Boulware & Valoir

(57) ABSTRACT

A tool designed for manipulation by an operator from a safe position out of line with the pig receiver opening in case an equipment failure or inadvertent opening of the trap before complete depressurization thereof should cause the pig to eject from the open end of the receiver. The tool features two main components, primarily a reaching assembly of substantially linear configuration having an elongated shape whose length runs along a first longitudinal axis, which lies generally parallel with a central longitudinal axis of the trap barrel during use of the tool, and support assembly that projects laterally from the reaching assembly in a direction generally perpendicular thereto so as to extend along a transverse axis that extends radially of the longitudinal axis.

12 Claims, 5 Drawing Sheets

SAFETY TOOL AND METHOD FOR PIPELINE PIG EXTRACTION

CROSS-REFERENCE TO RELATED APPLICATIONS

This application is a non-provisional application which claims benefit under 35 USC § 119(e) to Canadian Patent 2818549, filed Jun. 12, 2013, entitled "Safety Tool and Method for Pipeline Pig Extraction", which is incorporated by reference herein in its entirety.

STATEMENT REGARDING FEDERALLY SPONSORED RESEARCH OR DEVELOPMENT

None.

FIELD OF THE INVENTION

The present invention relates generally to the removal of a pig from a pig receiver of a pipeline, and more particularly to a tool and method for safely extracting the pig in a manner placing the human operator out of harm's way to minimize the risk of injury or fatality should pressurized ejection of the pig inadvertently occur.

BACKGROUND OF THE INVENTION

In the oil and gas industry, devices known as pigs are launched into fluid-transporting pipelines, and typically propelled through the pipeline by the pressure of the fluid being conveyed. Such pigs are used for different purposes, including separation of two different fluids being transported, cleaning the interior wall of the pipeline, and internally inspecting the integrity of the pipeline. The pig is removed from pipeline upon receipt of the pig at a receiver at an end of the pipeline.

A set of valves at the receiver are set into a condition that will convey the pig into a pipe that forms a trap barrel having a normally closed door mounted at an open end of this pipe, and when the arrival of the pig in the trap barrel is detected, the valves are set in a condition sealing off the trap barrel from the pressurized pipe line, and pressure in the trap barrel is vented to atmosphere. With the trap depressurized, the door is opened to enable the operator to extract the pig from the receiver through the open end of the trap barrel.

However, serious injury and even death has been known to occur as a result of unintended and unexpected ejection of the pig under pressure, for example as could potentially occur in the event of an equipment failure. Accordingly, there is a need to prevent or minimize the potential for impact of an operator by a pig forcefully ejected from the opening of the pig receiver.

Examples of manually carried and manually operated tools for extracting pigs from a safely depressurized pig trap can be found in U.S. Pat. Nos. 2,575,146 and 4,759,579, and Canadian Patent Application 2016138, but use of each of these tools places the operator in-line with the opening of the pig receiver, thus potentially placing them at risk.

U.S. Pat. No. 7,954,194 and U.S. Patent Application Publication No. 2011/0174387 disclose wheeled cart-like devices for extracting and transporting large pigs, but may be excessive in size and design complexity for extraction of smaller pigs.

U.S. Pat. No. 3,303,525 discloses a pig retriever that features a tapered basket situated inside the receiver for wedged receipt of a deformable pig within the basket, for subsequent removable of this basket and an attached plunger from the receiver for removal of the deformed pig from the basket using the plunger.

U.S. Pat. No. 5,524,675 teaches a safety device for automatically preventing an injectile in a pipeline from inadvertently escaping the pipeline at a coupling point thereof when the pipeline is decoupled at this point.

Applicant has developed a manually carried and manually operated pig extraction tool and method of operating same that are not disclosed or suggested by prior art and that allow for improved safety during withdrawal of pigs from pipeline receivers.

BRIEF SUMMARY OF THE DISCLOSURE

According to a first aspect of the invention there is provided a pig extraction tool for withdrawing a pig from an open end of a pig receiver of a pipeline, the tool comprising:

An elongated reach portion having a longitudinal axis defining an lengthwise direction;

A pig retrieval element carried at a respective end of the elongated reach portion for pulling of the pig from the open end of pig receiver after insertion of the respective end of the elongated reach portion into the pig receiver a sufficient distance to engage the pig retrieval element with the pig; and A support portion that is connected to the elongated reach portion at a location spaced from the retrieval element in the lengthwise direction and that projects laterally to a side of the elongated reach portion in a lateral direction transverse to the longitudinal direction for manual support of the tool from a lateral position spaced from the elongated reach portion.

Preferably there is provided a hand guard on the support portion on a side thereof facing toward the pig retrieval element in the longitudinal direction.

Preferably the support portion comprises a main support projecting in the lateral direction and a hand grip projecting from the main support behind the hand guard at a distance from the reach portion.

Preferably the main support projects beyond the hand grip in the lateral direction.

Preferably the main support comprises a branching portion extending laterally from the reaching portion to the hand grip, and an offset handle portion located beyond the hand grip in the lateral direction and offset to a side of the branching portion opposite the pig retrieval element in the longitudinal direction.

Preferably the respective end of the elongated reach portion is extendable and retractable relative to the support portion in the longitudinal direction.

Preferably there is provided a telescopic mechanism operable to extend and retract the respective end of the elongated reach portion relative to the support portion.

Preferably there is provided a lock and release mechanism operable from a distance laterally outward of the elongated reach portion to selectively unlock the reach assembly from a normally locked state in order to selectively enable extension or retraction of the respective end thereof.

Preferably the lock and release mechanism comprises an actuator positioned at the distance laterally outward from the elongated reach portion and operable to retract a lock member from a normal locking position engaged with a movable member of the reach assembly that is displaceable back and forth in the longitudinal direction when not engaged by the lock member.

Preferably the lock member is disposed internally of the support portion.

Preferably the actuator comprises a trigger projecting to an exterior of the support portion via a slot therein for pulling of the lock member away from the reaching portion against a biasing action of a spring that forces the lock member toward the reaching portion.

Preferably the reach assembly comprises a first member displaceable back and forth in the longitudinal direction relative to the support portion and a second member displaceable back and forth in the longitudinal direction relative to the first member.

Preferably there is provided a lock unit selectively switchable between a first locking state locking the first member in place relative to the support portion and a second locking state locking the second member in place relative to the first member.

Preferably there is provided a mirror carried on the reaching portion or the support portion in a position facing toward the retrieving element at the first end of the reaching portion.

According to a second aspect of the invention, there is provided a method of extracting a pig from a pig receiver of a pipeline, the method comprising using a manually operated retrieval tool to withdraw the pig from the pig receiver via an opening thereof from a location radially outward of said opening.

Preferably the tool comprises an elongated reach portion and a support portion connected to and extending laterally from the elongated reach portion, and the method comprises manually carrying the support portion of the tool thereof at the location radially outward of the opening of the pig receiver, and sliding and end of the longitudinal portion of the tool into the opening of the pig receiver, engaging an element at the end of the longitudinal portion of the tool with the pig, and with the pig engaged to the element, pulling the elongated reach portion of the tool, and the pig engaged thereto, out of the pig receiver via the opening.

BRIEF DESCRIPTION OF THE DRAWINGS

In the accompanying drawings, which illustrate an exemplary embodiment of the present invention.

DETAILED DESCRIPTION

Figure 1:
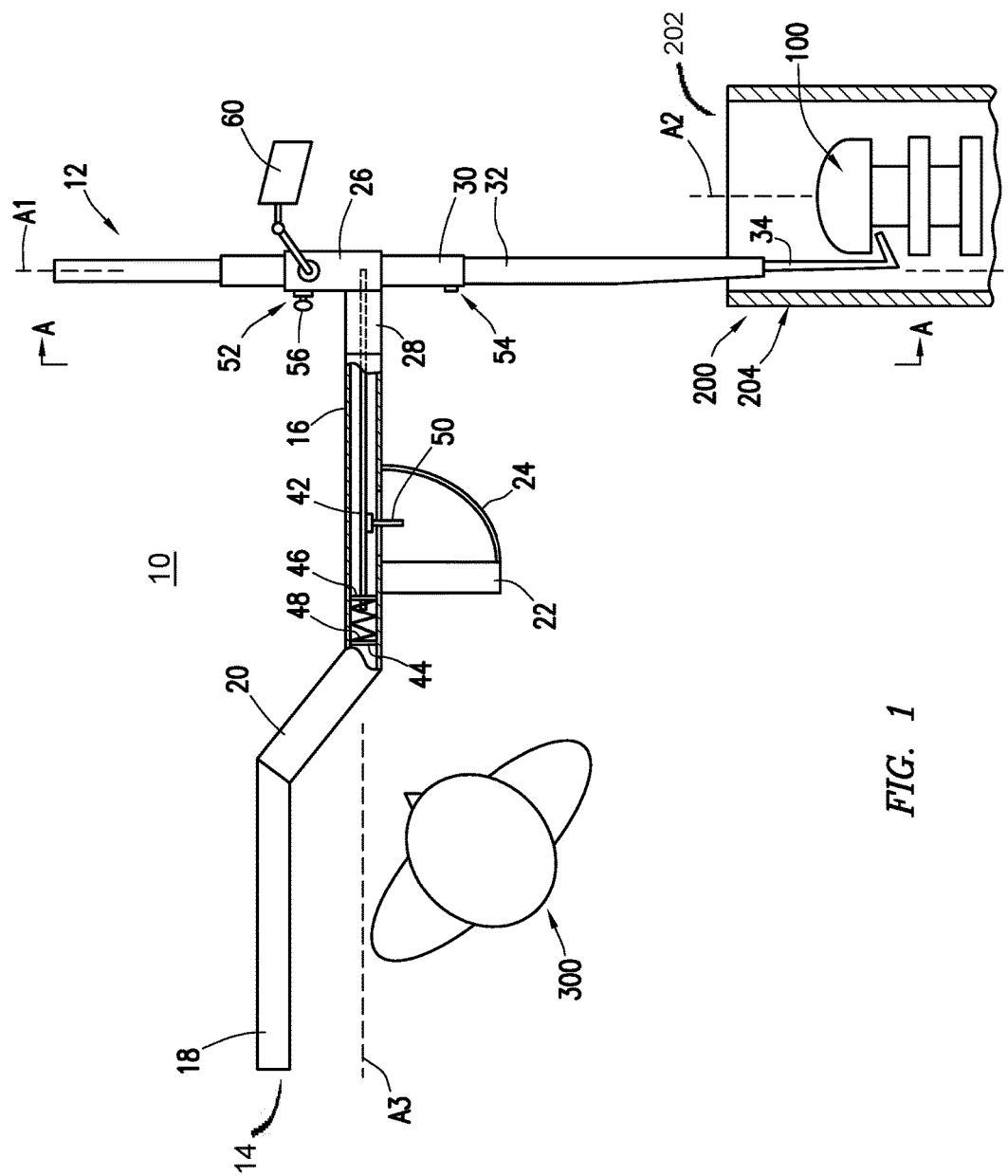
FIG. 1 is a schematic overhead plan view of a pig extraction tool of the present invention during use by an operator to withdraw a pig from a pig receiver of a pipeline.

FIG. 1 schematically illustrates use of a pig extraction tool 10 of the present invention to withdraw a pig 100 from a pig receiver 200 of a pipeline through an open end 202 of a trap barrel 204 of the receiver 200 once the normally closed door at this open end 202 of the trap barrel 204 has been opened after depressurization of the trap barrel 204. The tool is designed for manipulation by an operator 300 from a safe position out of line with the pig receiver opening 202 in case an equipment failure or inadvertent opening of the trap before complete depressurization thereof should cause the pig 100 to eject from the open end 202 of the receiver 200. Further details of the illustrated embodiment of the tool and its operation and use are outlined as follows.

The tool 10 features two main components, primarily a reaching assembly 12 of substantially linear configuration having an elongated shape whose length runs along a first longitudinal axis A1, which lies generally parallel with a central longitudinal axis A2 of the trap barrel 204 during use of the tool, and support assembly 14 that projects laterally from the reaching assembly 12 in a direction generally perpendicular thereto so as to extend along a transverse axis A3 that extends radially of the longitudinal axis A1 in a generally horizontal direction during use of the tool 10.

A first portion of the support assembly 14 that branches off from the reaching assembly 12 features a round tubing member 16 of linear extent lying perpendicular to the longitudinal axis A1 on the transverse axis A3. A distal end portion 18 of the support assembly furthest from the reaching assembly 12 features another round tubing member 18 of linear extent that lies parallel to the first round tubing member 16 of the support assembly, but if offset to one side by an intermediate round tubing member 20 that obliquely joins the other two round tubing members 16, 18 together. Near the end of the first round tubing member 16 attached to the angled tube 20, a hand grip 22 projects perpendicularly from the first round tubing member 16 in order to lie parallel to the reach assembly 12 on a side of the first tubing member 16 opposite that to which the angled round tubing member 20 extends to carry the offset round tubing member 18. A curved hand guard 24 is attached to the hand grip 22 at or near the distal end thereof opposite the first tube, from where the hand guard 24 follows a curved path to a connection point at an intermediate location on the first round tubing member 16 at a distance from the connection of the first round tubing member 16 to the reach assembly 12.

The reach assembly 12 has a telescopic structure, featuring an outermost rectangular tubing member 26 that lies on the longitudinal axis A1 and is attached to the support structure in a fixed position relative thereto. In the illustrated embodiment, a connection member 28 also formed of rectangular tubing, has one end fixed to the end of the first round tubing member 16 so as to lie in coaxial alignment therewith, and connects perpendicularly to the outermost rectangular tubing member 26 of the reaching assembly 12. These two pieces of rectangular tubing 26, 28 are joined at an opening that is cut into the side wall of the reaching assembly's outermost rectangular tubing member 26 so that the hollow interior passage of the connection member 28 opens into the hollow interior passage of the outermost rectangular tubing member 26 at the side thereof from which the support assembly 14 extends . . . .

An intermediate rectangular tubing member 30 of smaller cross-sectional size and greater axial length than the outermost rectangular tubing member 26 is slidably disposed therein for telescopic movement relative thereto along the longitudinal axis A1. An innermost rectangular tubing member 32 of smaller cross-section and greater axial length than the intermediate rectangular tubing member 30 is slidably disposed therein for telescopic movement relative thereto along the longitudinal axis A1. A hook member 34 is fixed to a respective end of the innermost rectangular tubing member 32 that resides on a same side of the support assembly 14 as the hand grip 22, and defines a retrieving element for engaging the pig 100 and pulling of same out from the pipe receiver 200. Due to the telescopic construction of the reaching assembly, the distance to which the hook member 34 reaches from the support assembly 14 can be adjusted by telescoping the tubular members of the reach assembly 12 relative to one another. Mechanisms for locking and releasing the tubular members of the reach assembly to and from one another are provided so as to be operable to prevent inadvertent movement between the tubular members of the reach assembly while allowing selective adjustment therebetween.

The intermediate and innermost rectangular tubing members 30, 32 each feature a respective series of holes 36, 38 in the side wall thereof that faces toward the support assembly. In each series of holes, the inter-hole spacing between each pair of adjacent holes in the series is equal, and this inter-hole distance is the same for both series of holes.

A trigger-released lock mechanism automatically locks the reaching assembly by default, and features a lock rod or bar 42 that extends axially within the first round tubing member 16 of the support assembly and reaches into the connection member 28. A circular stop plate 44 closes off the hollow interior passage of the first round tubing member 16 near the end thereof to which the angled round tubing member 20 is attached. A push plate 46 is fixed to the lock rod 42 at or near the end thereof nearest the stop plate 44 so as to project radially from the lock rod 42 inside the first round tubing member 16. A compression spring 48 is disposed between the stop plate 44 and the push plate 46 inside the first round tubing member 16, for example coiling around an end portion of the lock rod 42 that extends through a central opening of an annular form of the push plate 46.

The spring force acts to bias the lock rod 42 into a locking position in which the opposing end of the lock rod 42 reaches into the outermost rectangular tubing member 26 through the sidewall cutaway thereof, far enough to reach into the holes 36, 38 of the intermediate and innermost rectangular tubing members 30, 32 when a pair of such holes are aligned among these two members. A trigger 50 is fixed to the lock rod 42 to project radially therefrom through a slot in the first round tubing member 16 at the side thereof from which the hand grip 22 projects. The slot has an elongated shape running axially of the first round tubing member 16 at an area thereof between where the hand grip 22 and the hand guard 24 respectively attach to the first round tubing member 16.

An operator 300 of the tool stands on the same side of the support portion 14 as the hand grip 22, particularly at a position located between the hand grip 22 and the distal end of the offset round tubing member 18. The operator carries and supports the tool with one hand on the hand grip 22 and the other hand on either the offset or angled round tubing member 18, 20, which form a handle of the support assembly.

In the event that the operator wishes to telescopically adjust the reaching portion 12 in order to adjust the effective reaching distance of same, the index finger of the hand on the hand grip 22 is used to pull the trigger 50 back toward the hand grip 22, thus pulling the lock rod 42 out of the locking position against the bias of the spring 48. This withdraws the end of the lock rod 42 from the innermost and intermediate 32, 30 members of the reach assembly 12. A second lock mechanism is operable to control which one of either the intermediate or innermost rectangular tubing members 30, 32 is slidable relative to the outermost rectangular tubing member 26 under disengagement of the trigger-controlled lock mechanism. The second lock mechanism features a pair of lock sites 52, 54, one of which is located at a side wall of the outermost rectangular tubing member 26 that faces toward the support assembly 14, and another of which is located in a matching side wall of the intermediate rectangular tubing member 30 that also faces toward the support assembly and has the respective series of holes 36 therein. Each mounting site features an aperture 53 extending through the side wall of the respective reach member.

In the illustrated embodiment, each lock site features an annular protuberance projecting from the respective side wall around the aperture therein, for example as may be provided by welding of a nut 54 to the side wall with the bore of the nut aligned with the aperture. The lock site 54 on the intermediate rectangular tubing member 30 is axially spaced from an end one of the series of holes 38 therein by the same inter-hole distance by which the holes are spaced apart from one another. The axial distance between the first lock site 52 and the lock rod 42 matches the inter-hole distance of the series of holes 36, 38 in the innermost and intermediate rectangular tubing members 32, 30.

A removable lock member 56 is selectively engagable with either of the two lock sites 52, 54. The lock member 56 features a shaft 56a of small enough diameter to fit through the lock passage defined by the bore of the lock site protuberance and the aligned side wall aperture of the lock site, and also features a head 56b too large to fit through this lock passage.

As shown in Figure, when engaged into the lock passage of the first locking site 52 in the outermost rectangular tubing member 26, the shaft 56a of the lock member 56 reaches through the lock passage and into one of the holes 36 in the intermediate rectangular tubing member 30 that is aligned with that lock passage, but without reaching through the hole into the interior of the intermediate rectangular tubing member 30. This way, the lock member 56 engages the intermediate rectangular tubing member 30 to block axial sliding thereof relative to the outermost rectangular tubing member 26, without engaging the innermost rectangular tubing member 32.

With the removable lock member 56 in this first locked state, the intermediate rectangular tubing member 30 is locked against telescopic axial movement relative to the outermost rectangular tubing member 26 by the lock member 56. The innermost rectangular tubing member 32 is normally locked against telescopic axial movement relative to the intermediate rectangular tubing member 30 by the spring biased lock rod 42 engaged in a sidewall opening of the innermost rectangular tubing member 30 via an aligned opening of the intermediate rectangular tubing member 32. However, pulling of the trigger 50 disengages the lock rod from the innermost rectangular tubing member, whereupon the operator can axially displace the innermost rectangular tubing member 32 relative to the intermediate rectangular tubing member 30 in order to adjust the reach assembly's distance of reach from the support assembly 14.

Figure 2:
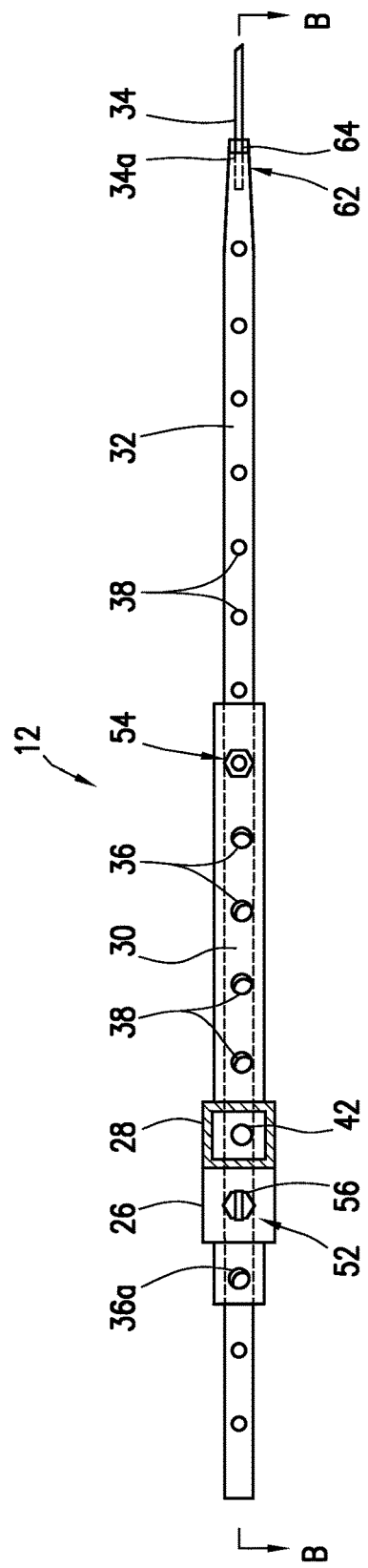
FIG. 2 is a cross-sectional view of the tool of FIG. 1 as viewed along line A-A thereof to better illustrate the workings of an extendable/retractable reaching assembly of the tool, which is shown locked in a partially extended state.

FIG. 2 shows the reach assembly with the removable lock member 56 in the first locked state and the trigger-released lock mechanism in its default lock condition, whereby both the innermost and intermediate rectangular tubing members are locked in place to fix the effective reach of the reach assembly. The figure shows the reach assembly 12 in an intermediate extended state reaching a significant distance from the support assembly 14, but notably short of a maximum reach achievable by the hook member 34 by further extension of the reach assembly 14. That is, while this drawing shows the lock member 56 engaged to the intermediate rectangular tubing member 30 through the first lock site 52 near an end of the intermediate rectangular tubing member 30 furthest from the hook member 34, whereby the intermediate rectangular tubing member 30 is in a substantially extended state in which the majority of its length is disposed between the hook member 34 and the end of the outermost rectangular tubing member 26 nearest the hook member 34, it also shows the innermost member 32 in an intermediately retracted state, in which the innermost member 32 reaches back fully through the intermediate and innermost rectangular tubing members 30, 26.

Leaving the lock member 56 in place in the first locking state of FIG. 2, the trigger can be used to release the lock rod 42 and allow manual sliding of the innermost rectangular tubing member 32 in either direction in order to change which of the holes 38 therein is aligned with the lock rod 42 for engagement thereby under release of the trigger 50, whereby the operator can shorten or lengthen the reach of the hook member 34 from the support assembly 14 by extending or retracting the respective end of the innermost rectangular tubing member 32. The lock rod 42 undergoes an automatic locking action, in that if the trigger 50 is released at a moment in which no hole 38 in the innermost tubing member 32 aligns with the lock rod, the lock rod 42 will simply ride along the sidewall of the innermost rectangular tubing member 32 during telescopic movement thereof until a hole in this sidewall arrives at the tip of the spring-biased lock rod 42, at which point the tip of the lock rod 42 will automatically enter that hole and engage the rectangular tubing member 32.

Figure 3:
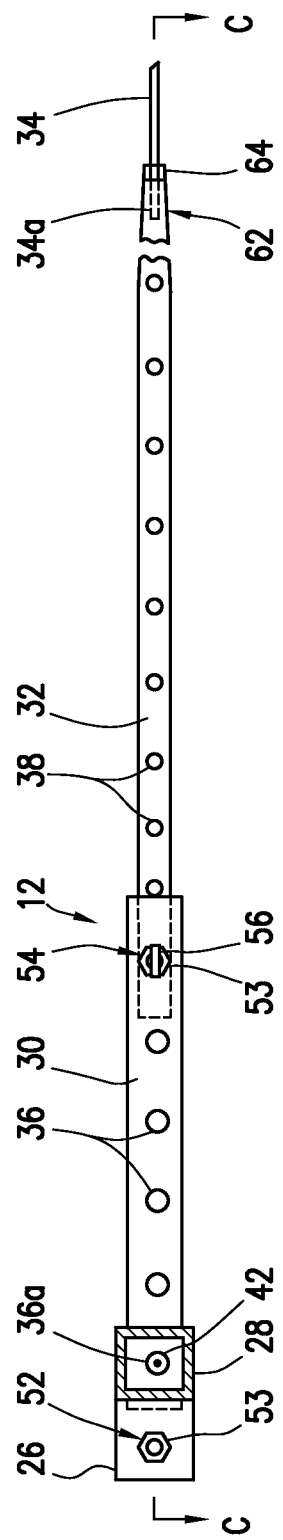
FIG. 3 is another cross-sectional view of the tool like that of FIG. 2, but with the reaching assembly of the tool shown in fully extended state.
Figure 4:
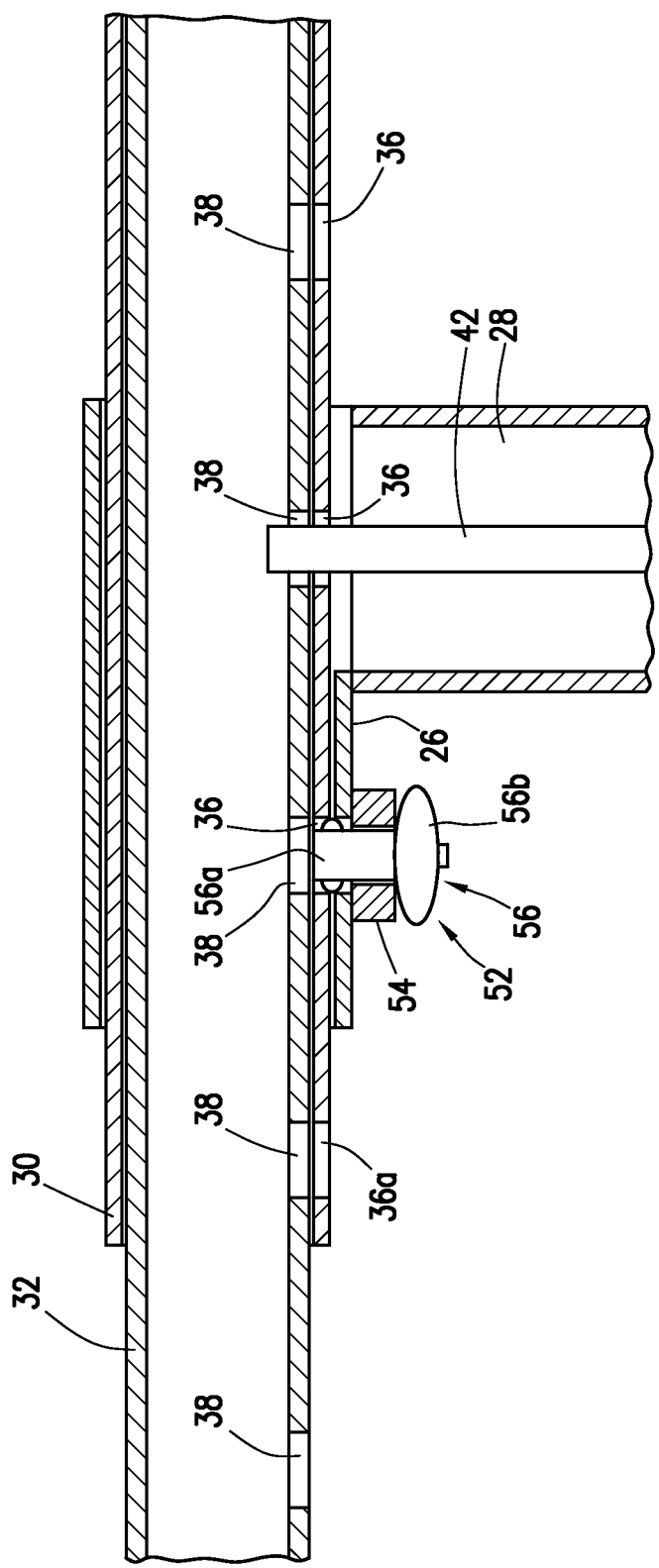
FIG. 4 is a partial cross-sectional view of the tool of FIG. 2 as viewed along line B-B thereof.
Figure 5:
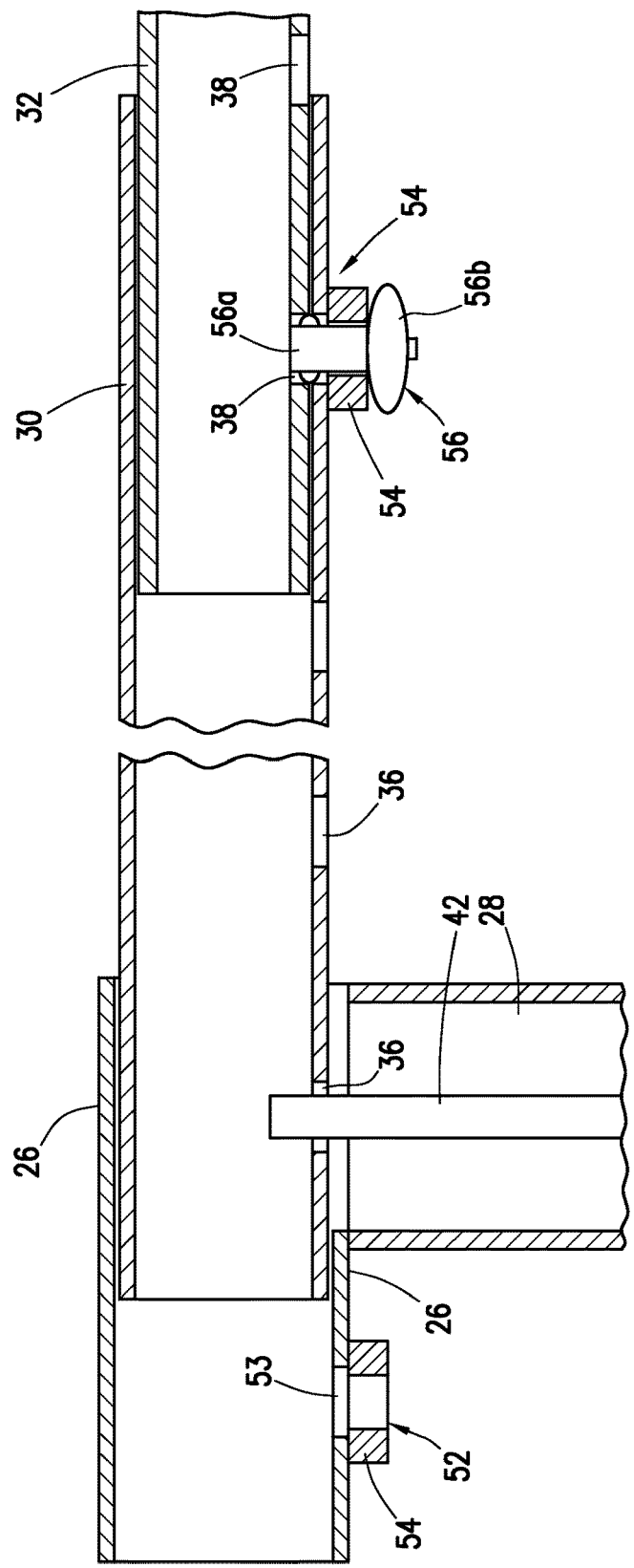
FIG. 5 is a partial cross-sectional view of the tool of FIG. 3 as viewed along line C-C thereof.

In comparison, FIG. 3 shows the lock member 56 in the second locked state, and shows the innermost and intermediate rectangular tubing members 32, 30 in their positions of maximum extension, placing the hook member 34 at its maximum attainable distance from the support assembly 16. That is, the lock member 56 is inserted at the second lock site 54 near the end of the intermediate rectangular tubing member 30 nearest the hook member 34, and is engaged into an end-one of the holes 38 in the innermost rectangular tubing member 32 furthest from the hook member 34, whereby a substantial majority of the innermost member's length projects from the intermediate rectangular tubing member 30 to the hook member 34. The intermediate rectangular tubing member 30 is engaged by the lock rod 42 at an end-one of its holes 36a furthest from the hook member 34, whereby a substantial majority of the intermediate rectangular tubing member 30 projects from the end of the outermost rectangular tubing member 26 nearest the hook member 34.

Leaving the lock member 56 in place in the second locking state of FIG. 3, the trigger can be used to release the lock rod 42 and allow manual sliding of the intermediate rectangular tubing member 30 in a retracting direction pulling the second locking site 54 back toward the outermost rectangular tubing member 26 in order to change which of the holes 36 therein is aligned with the lock rod for engagement thereby under release of the trigger, whereby the operator can shorten the reach of the hook member 34, as the innermost rectangular tubing member 32 is carried on the intermediate rectangular tubing member 30 at the second locking site 54 by the locking member 56. With the locking member 56 in the second locking state, the lock rod 42 automatically locks with the intermediate rectangular tubing member 30 in the same manner described above for the innermost rectangular tubing member when the locking member is in the first locking state.

The lock member may be a threaded member, for example a wing nut that is manually threaded into an internally threaded nut fixed to the side wall exterior at each locking site, or may be a quick connect device, for example a ball detent pin.

The outer, intermediate and inner rectangular tubing members thus respectively define a channel, a sliding sleeve slidably disposed within the channel, and an extension arm slidably disposed within the sliding sleeve.

With the lock member 56 in the first locking state of FIG. 2, the tool is in a first mode in which the sliding sleeve 30 stays static and is held to the handle-defining support assembly 14 by the lock member 56. The arm 30 is slidable back and forth unless locked in place by the trigger-controlled locking rod or pin 42. This mode is suitable for use with shorter pig traps, where the maximum attainable reach of the tool from the operator carried support portion is not required.

With the lock member in the second locking state of FIG. 3, after having been moved to the sliding sleeve 30 from the first locking state on the channel 26, the tool is in a second mode in which the arm 32 is held to the sleeve 30 at full extension from the support assembly. Now the trigger-released lock pin or rod 42 only controls the length by which the sliding sleeve 30 reaches from the support assembly. This mode is useful for very long pig traps. The combined length of the arm and sliding sleeve is much longer, allowing the operator to reach further from their position.

With reference to FIG. 1, which a pig 100 has been received in the trap barrel 204 and the trap barrel is then isolated and depressurized, the operator, from a position standing safely out of line from the trap opening 202, opens the door of the trap. Remaining at a position radially outward from the area of the trap opening 202 at a lateral position horizontally spaced off to the side of the trap barrel, the operator picks up the tool by the handle 18, 20 and hand grip 22 of the support assembly 14, and brings the tool into a position substantially aligning the reach assembly 12 of the tool with the pipe barrel 204. A mirror 60 is mounted atop the channel-defining outer tubing member 26 of the reach assembly 12, or at another location proximate the connection of the support and reach assemblies, and faces toward the hook member 34 along the longitudinal axis A1, whereby from the position safely off to the side of the pig trap, the user can view into the opening 202 of the pig trap in order to aid in a determination of the pig's current location within the trap. Visually judging how far into the trap the pig 100 is located, the user can assess the amount of reach that will be necessary in order to engage the hook member 34 of the tool with the pig 100 from the open end 202 of the trap.

The user can thus adjust the reach assembly if needed, preferably first bringing the entirety of the tool out of line with the pig trap opening in order to safely move the lock member 56 from one locking state to the other, if such adjustment is needed. If use of the trigger-controlled lock mechanism is all that is required, then the operator need not necessarily withdraw the entire tool from in front of the opening 202, and for example may shorten the reach of the reach assembly by pulling the trigger and forcing the hook-member 34 somewhere against the pig trap in order to push the arm 32, or am and sliding sleeve combination, back through the channel of the outermost tubing member 26 of the reach assembly 12, or may lengthen the reach assembly 12 by pulling the trigger 50 and turning the tool around the lateral axis A3 of the support assembly in order to face the hook-free end of the reach assembly 12 down against the ground in order to push the arm 32, or arm and sliding sleeve combination, further through the channel of the outer tubing member of the reach assembly 26.

With a suitable reach length of the reach assembly set, the operator inserts the hook-equipped end of the reach assembly into the trap barrel 204 through the open end 202 thereof to reach past the nearest end of the pig 100 and catch the hook member 34 to a suitable area of the pig 100 by which the pig 100 can then be pulled out the open end 202 of the trap 204 by withdrawing the hook-equipped end of the reach assembly 12 from same. Attempts to hook the pig can be aided by visual guidance of the tool's hook member using the mirror 60, without placing any part of the operator's body in line with the pig trap opening 202. The distance from the reach assembly 12 to the hand guard 24 preferably exceeds the diameter of the pig trap opening 202 in order to ensure that even the nearest hand of the operator remains spaced laterally outward from the pig trap opening 202 during use of the tool 10.

While the illustrated embodiment employs round tubing for the entire support assembly 14, whereby the round tubing at the handle formed by the offset and angled members 18, 20 forms provides comfortable shape for manual gripping, it will be appreciated that members of other outer peripheral shape may be employed. In addition, although hollow members provide the advantage of reduced weight, only the member 16 that contains the internally housed trigger-released locking mechanism need be. hollow. Other embodiments may employ an external locking mechanism that does not require a hollow member 16 in order to accommodate the locking mechanism. Similarly, while the channel-defining outer member 26 and sliding-sleeve intermediate member 30 of the reach assembly 12 of the illustrated embodiment need be hollow in order to have the described telescopic relationship, it will be appreciated that the arm-defining inner member 32 need not necessarily be a hollow tubular member, although a solid arm may add undesirable weight to the tool. The outer surfaces of the hand grip 22 and handle segments 18, 20 of the support assembly 14 may feature knurling or other texturization to aid in confident grip of the tool.

While the illustrated embodiment employs a reach-adjustable configuration providing two stages of adjustment, it will be appreciated that single stage adjustment with only a single lock mechanism may be used in other embodiments. Fixed-reach embodiments of no-adjustability are also contemplated, which would nonetheless still have the benefit of placing the operator safely out of line with the pig trap opening 202 during the pig extraction process. In addition to the described reach adjustment of the illustrated arm 32, it will be appreciated that the inner arm 32 may also be fully removed, and substituted for an inner arm of different length in order to add even more flexibility to the tool. The hook member 34 may be detachable from the inner arm 32, for example by engagement of a threaded shaft 34*a* of the hook member 34 with a matingly threaded coupling feature 62 at the respective end of the arm, and optional inclusion of a lock nut 64 to better secure the hook member 34 in place and prevent inadvertent loosening of same. Accordingly, different sizes or styles of hook member may be substituted for one another, for example according to the type of pig or pig trap on which the tool is being used.

In embodiments including a mirror, the mirror may use a ball and socket joint, bendable but shape-retaining support arm, or combination thereof, or other adjustable support option. to allow the operator to adjust the orientation of the mirror for optimal viewing of the pig trap interior. In some embodiments, the mirror may be detachably mounted on the tool to allow optional removal therefrom, for example for use by the operator to peer into the pig trap from there beside prior to picking up the entire tool Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pig extraction tool for withdrawing a pig from an open end of a pig receiver of a pipeline, the tool comprising:
  an elongated reach portion having a longitudinal axis defining a lengthwise direction,
  a pig retrieval element carried at a respective end of the elongated reach portion for pulling of the pig from the open end of the pig receiver after insertion of the respective end of the elongated reach portion into the pig receiver a sufficient distance to engage the pig retrieval element with the pig; and
  a support portion that is connected to the elongated reach portion at a location spaced from the pig retrieval element in the lengthwise direction and that projects laterally to a side of the elongated reach portion in a lateral direction transverse to the longitudinal axis for manual support of the tool from a lateral position spaced from the elongated reach portion;
  wherein said respective end of the elongated reach portion comprises a first movable member that is extendable and retractable in the longitudinal axis;
  wherein said pig extraction tool comprises a lock and release mechanism disposed internally of the support portion and operable from a distance to selectively unlock the elongated reach portion from a normally locked state in order to selectively enable extension or retraction of the first movable member, wherein the lock and release mechanism comprises an actuator positioned at a distance laterally outward from the elongated reach portion and operable to retract a lock member from a normal locking position engaged with said first movable member when not engaged by the lock member.

2. The tool of claim 1, comprising a hand guard on the support portion on a side thereof facing toward the pig retrieval element in the longitudinal axis.

3. The tool of claim 2, wherein the support portion comprises a main support projecting in the lateral direction and a hand grip projecting from the main support behind the hand guard at a distance from the elongated reach portion.

4. The tool of claim 3, wherein the main support projects beyond the hand grip in the lateral direction.

5. The tool of claim 1, wherein the main support comprises a branching portion extending laterally from the elongated reach portion to the hand grip, and an offset handle portion located beyond the hand grip in the lateral direction and offset to a side of the branching portion opposite the pig retrieval element in the longitudinal axis.

6. The tool of claim 1, comprising a telescopic mechanism operable to extend and retract the first movable member in the longitudinal axis.

7. The tool of claim 1, wherein the actuator comprises a trigger projecting to an exterior of the support portion via a slot therein for pulling of the lock member away from the first movable member against a biasing action of a spring that forces the lock member toward the first movable member.

8. The tool of claim 1, wherein the elongated reach portion comprises a second movable member displaceable back and forth in the longitudinal axis.

9. The tool of claim 8, comprising a lock unit selectively switchable between a first locking state locking the first movable member in place relative to the support portion and a second locking state locking the second member in place relative to the first movable member.

10. The tool of claim 1, comprising a mirror carried on the elongated reach portion or the support portion in a position facing toward the pig retrieval element at the first end of the elongated reach portion.

11. A method of extracting a pig from a pig receiver of a pipeline, the method comprising using a manually operated pig extraction tool to withdraw the pig from the pig receiver via an opening thereof from a location radially outward of said opening, wherein the pig extraction tool comprises the pig extraction tool of claim 1.

12. The method of claim 11, wherein the method further comprises manually carrying the support portion of the pig extraction tool at a location radially outward of the opening of the pig receiver, retracting said lock member and sliding said respective end of the elongated reach portion of the tool into the opening of the pig receiver, engaging said pig retrieval element at the respective end of the elongated reach portion of the tool with the pig, and pulling the elongated reach portion of the pig extraction tool with the pig engaged to the pig retrieval element out of the pig receiver via the opening.

* * * * *

UNITED STATES PATENT AND TRADEMARK OFFICE
CERTIFICATE OF CORRECTION

PATENT NO.        : 10,408,376 B2
APPLICATION NO.   : 14/303358
DATED             : September 10, 2019
INVENTOR(S)       : Michael Jeff Kazakoff, Dale George Gobin and Mark Kappelhoff Page 1 of 1

It is certified that error appears in the above-identified patent and that said Letters Patent is hereby corrected as shown below:

On the Title Page

Item (30), add "Foreign Application Priority Date":
Jun. 12, 2013 (CA) 2818549

In the Claims

Column 10, Lines 53-58, should read:
The tool of claim 4, wherein the main support comprises a branching portion extending laterally from the enlongated reach portion to the hand grip, and an offset handle portion beyond the hand grip in the lateral direction and offset to a side of the branching portion opposite the pig retrieval element in the longitudinal axis.

<div style="text-align:right">

Signed and Sealed this
Twenty-fourth Day of November, 2020

Andrei Iancu
*Director of the United States Patent and Trademark Office*

</div>